H. H. HURT.
PROCESS OF MAKING ROADS.
APPLICATION FILED MAY 27, 1918.
1,424,308.
Patented Aug. 1, 1922.
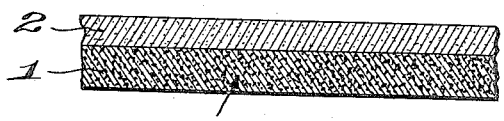
COMMINUTED OLD BASE AND
TOP MIXED WITH CLAY AND
WASTE SULFITE LIQUOR SOLIDS.
Witness
Chas. L. Griesbauer
Inventor
Henry Hicks Hurt,
By K. P. McElroy
his Attorney

UNITED STATES PATENT OFFICE.

HENRY HICKS HURT, OF YONKERS, NEW YORK, ASSIGNOR TO ROBESON PROCESS COMPANY, OF NEW YORK, N. Y., A CORPORATION OF NEW JERSEY.

PROCESS OF MAKING ROADS.

1,424,308. Specification of Letters Patent. Patented Aug. 1, 1922.

Application filed May 27, 1918. Serial No. 236,743.

*To all whom it may concern:*

Be it known that I, HENRY HICKS HURT, a citizen of the United States, residing at Yonkers, in the county of Westchester and State of New York, have invented certain new and useful Improvements in Processes of Making Roads, of which the following is a specification.

This invention relates to processes of making roads; and it comprises a method of making a road bed wherein old asphaltic paving material is ground to a fine or sandlike character, admixed with clay and with waste sulfite liquor and applied as a paving material on a road, in some cases this application being followed by that of a layer of asphalt surfacing material; all as more fully hereinafter set forth and as claimed.

Asphalt pavements as they are usually laid in this country are built-up structures, there being an under layer of grout or concrete, then a layer of gravel or broken stone and asphalt or asphalt composition and, finally, a top facing or surfacing layer of asphalt and fine material. After a time, it becomes necessary to patch or renew these roads and old material is dug out down to the concrete layer and generally sent to waste, being used for filling land, etc. No use is made of the old pavements in practice.

I have found that I can make an excellent, substantially waterproof pavement or roadbed from this discarded material by grinding it and mixing with a little clay and concentrated waste sulfite liquor. As a rule I pass the entire material, that is, broken up roadbed fragments containing the body of rock or gravel with asphalt (or the base) and the surface layer of asphalt and fine material (or the top), through a rock crusher or similar machine and reduce it to about the fineness of ordinary sand. This granular material, which represents all the constituents of the old road, usually runs about 13 per cent asphalt. The amount of asphalt which was sufficient for binding purposes in the original pavement is insufficient for binding purposes after the grinding operation in which, of course, the surface area of the mineral matter has been very largely increased. There is not enough asphalt present to bind the material after reduction to a sand like fineness; and in order to make a good pavement it is necessary to add an auxiliary binder. As this binder, I use sulfite waste liquor solids. The amount of sulfite waste liquor solids necessary as an auxiliary binder may be reduced by using a certain proportion of clay therewith; clay and sulfite waste liquor preparations developing a binding power which is more than the sum of their separate binding powers.

With this sandlike material I usually mix about 15 per cent (by volume) of powdered dry clay and then add concentrated waste sulfite liquor in the amount of about one part by volume to, say, twenty five parts by volume. While the mixture of disintegrated old pavement and clay may be laid and leveled up in the pavement and then the concentrated waste sulfite liquor sprinkled on the road in about the proportions stated, I find it generally better to make the mixture before laying the pavement. In so doing, I may take the mixture of disintegrated old road and clay and mix with it the desired amount of concentrated waste sulfite liquor which may be somewhat diluted with water if desired. I usually mix the materials in an ordinary mixer of the kind used for making concrete and aim to make a mixture which is somewhat pasty. For this purpose, with the usual run of disintegrated paving and clay, I find that the stated proportion of about 1 part by volume of commercial concentrated 30° Baumé sulfite liquor to 25 parts of the clay-paving mixture gives me about the right consistency. The mixture so made may be laid on a road, leveled up, tamped, etc., in the usual way. On drying it gives a firm hard pavement, little susceptible to wear. It is usually practically waterproof, although its resistance to water depends somewhat upon the character of clay and paving material used. Some old pavings give a road which is more waterproof than do others; the difference of course corresponding to the composition of the original paving. In some cases, with material which on mixing and drying does not appear sufficiently waterproof, I may face the road with the ordinary asphalt surfacing; that is, a mixture of asphalt and fine material, such as sand, lime, etc. But in many cases, this additional surfacing is not necessary.

While other concentrated waste sulfite liquor preparations may be employed, I find most advantageous the material made by the process of Patent No. 833,634. This material gives a paving of more waterproof quality and otherwise more desirable than do other concentrated sulfite liquor preparations. In making paper pulp by the sulfite process, the wood is digested with a bisulfite solution; usually a solution containing bisulfite of lime and also bisulfite of magnesia. About half the wood combines with the bisulfite to form dissolved bodies of organic nature which are usually called, for the sake of a name, ligno-sulfonates. The liquor as it leaves the digester is however quite sensitive to heat and it is difficult to evaporate it without substantial changes occurring in its composition. While it contains very little sulfurous acid or bisulfite as such, there is enough free sulfurous acid present to initiate chemical action with the production of more sulfurous acid and of chemical changes in the dissolved organic colloid solids to which the sulfite liquor owes its value as a binder, the lignosulfonates. In making the material according to No. 833,634, the liquor is first neutralized to obviate the presence of free acid and then evaporated, giving a material in which the organic matters preserve their original valuable character. It is such material that I find most valuable for the present purposes.

Sulfite liquor preparations are usually quite soluble in water and while they are valuable bonding agents, materials bonded thereby are not ordinarily waterproof after drying in the sense that they will resist the action of much water. In the presence of clay however (see Patents Nos. 1,069,029, 1,069,030 and 1,069,031) these materials are much more resistant to water when dried down than in its absence, and for this reason I incorporate a certain amount of dried clay, usually about 15 per cent by volume, with the old paving material. Ordinary paving material is usually not rich in clay or clay-yielding materials. In some cases however the ground old paving gives fairly waterproof results without the use of added clay and in this event I do not employ it. But as a rule I find the addition of 10 to 15 per cent of clay very useful in making paving under the present invention.

In the accompanying drawings I have shown a sectional view of a pavement within the purview of the present invention.

In this showing, element 1 indicates the base or foundation of the road made from the base and top of an old road and comminuted to a desired degree of fineness. Clay and concentrated waste sulfite liquor are added after this comminution as explained and are dispersed throughout the ground mixture. They are indicated by legends. Element 2 indicates a surface layer or top of asphalt or the like.

What I claim is:—

1. The process of making roads which comprises regrinding old base and top of asphalt pavements to a sandlike fineness and forming a roadbed thereof with the aid of sulfite waste liquor.

2. The process of making roads which comprises regrinding old base and top of asphalt pavements to a sandlike fineness, mixing with dry clay and forming a roadbed thereof with the aid of sulfite waste liquor.

3. The process of making roads which comprises regrinding old base and top of asphalt pavements to a sandlike fineness, mixing in a small proportion of dry clay, adding sufficient concentrated waste sulfite liquor to make a pasty mass and applying to the roadbed.

4. The process of making roads which comprises regrinding old base and top of asphalt pavements to a sandlike fineness, mixing in a small proportion of dry clay, adding sufficient concentrated waste sulfite liquor to make a pasty mass, applying to the roadbed, drying and applying a surfacing asphalt layer.

In testimony whereof, I affix my signature hereto.

HENRY HICKS HURT.